G. A. SCHEEFFER,
POPCORN MACHINE.
APPLICATION FILED OCT. 2, 1916.
1,251,291.
Patented Dec. 25, 1917.
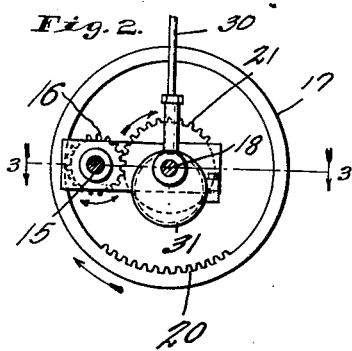
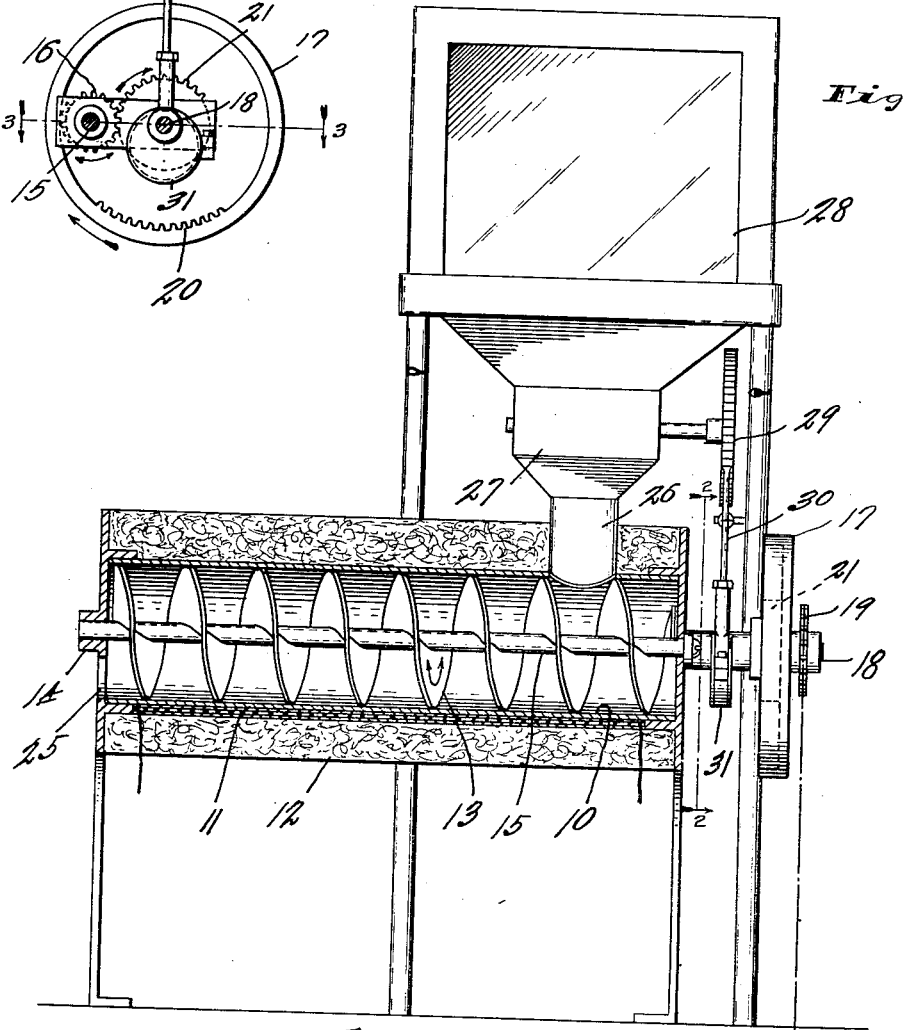
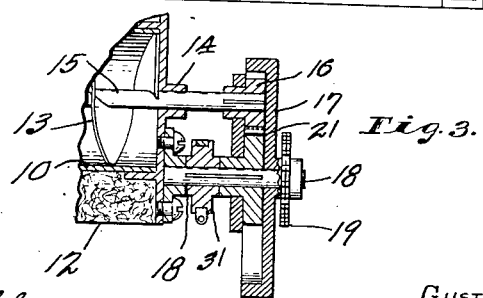
WITNESSES:
INVENTOR
GUSTAVE A. SCHEEFFER,
BY
ATTORNEYS

UNITED STATES PATENT OFFICE.

GUSTAVE A. SCHEEFFER, OF INDIANAPOLIS, INDIANA, ASSIGNOR, BY MESNE ASSIGNMENTS, TO HOLCOMB & HOKE MFG. CO., OF INDIANAPOLIS, INDIANA, A CORPORATION OF INDIANA.

POPCORN-MACHINE.

1,251,291.   Specification of Letters Patent.   Patented Dec. 25, 1917.

Application filed October 2, 1916. Serial No. 123,210.

*To all whom it may concern:*

Be it known that I, GUSTAVE A. SCHEEFFER, a citizen of the United States, residing at Indianapolis, in the county of Marion and State of Indiana, have invented new and useful Popcorn-Machines, of which the following is a specification.

It is the object of my present invention to provide a continuous pop corn machine, in which the pop corn is moved back and forth on a heating element, with the forward movement slightly greater than the backward movement so that there is a resultant gradual forward movement of the corn.

In attaining this object, I provide a suitably heated support for the pop corn, conveniently tubular in form, and associate with this a worm conveyer, and provide driving mechanism which drives the worm alternately in opposite directions, with a greater angular movement in one direction than in the other so that there is a resultant gradual movement of the worm in the first direction, and feed corn on to one end of this support and let it be discharged at the other by the movement of the worm.

The accompanying drawing illustrates my invention. Figure 1 is an elevation in partial section of a pop corn machine embodying my invention, Fig. 2 is a section on the line 2—2 of Fig. 1; and Fig. 3 is a section on the line 3—3 of Fig. 2.

The pop corn support is shown as a horizontal tube 10, which is heated, conveniently on the under part only, by any suitable heater, such as the electric heater 11. For economy of heat, the tube 10 is preferably surrounded by a layer of heat-insulating material 12, as of asbestos. A worm conveyer 13 is mounted within the tube 10, being supported in suitable bearings 14 in the tube ends, the shaft 15 of such worm conveyer being provided beyond one end of the tube with a spur-gear 16. Coöperating with the spur gear 16 is a driving member 17 fixed on a suitably mounted shaft 18 and driven in any suitable manner, as by a chain on the sprocket 19 on such shaft 18. The driving member 17 is provided with a partial or mutilated internal gear 20 and a partial or mutilated external gear 21, which alternately mesh with the gear 16, so that upon the rotation of the driving member 17 the spur gear 16 with its worm conveyer 13 is driven alternately in opposite directions. In order to get a gradual resultant advance of the worm 15, the movement of the worm gear 16 is caused to be greater in one direction than in the other. This is most conveniently done by providing a slightly greater number of teeth on the internal gear 20 than on the external gear 21, so that a greater angular movement of the gear 16 is obtained from the internal gear than from the external gear.

However, since each tooth of the internal gear 20 remains in mesh with the gear 16 for a greater angular movement of the latter than does a tooth of the external gear 21, and since the internal gear 20 moves at a greater angular speed than does the external gear 21 and therefore drives the spur-gear 16 and the worm 13 more rapidly so that they may be thrown forward by momentum after the internal gear 21 and the spur-gear 16 pass out of mesh, it is possible to obtain the gradual resultant movement of the worm in one direction, even though the number of teeth on the internal gear is not greater than the number on the external gear; though I prefer not to rely on any momentum action, because it is not uniform in its effects.

The resultant movement of the worm 15 is in the direction to feed material along the tube 10 toward the left (as shown in Fig. 1). Therefore, the tube 10 is provided at the lower part of the left hand end with a discharge opening 25, and near the right hand end at the top is provided with an admission opening 26. This admission opening communicates with a feeding device 27 supplied from a hopper 28, the feeding mechanism being of any desired type, so as to feed pop corn to the opening 26. As shown, the feeding device 27 has a ratchet wheel 29, which is fed by a pawl 30 which is reciprocated by an eccentric mechanism 31 on the shaft 18.

In operation, the pop corn is placed in the hopper 28, and the machine is started in motion, by power from any convenient source. The shaft 18 moves continuously in one direction, and the operation of the eccentric 31 works the feeding mechanism 27 to feed pop corn through the admission opening 26 into the right hand end of the tube 10. The operation of the shaft 18 in one direction produces a movement of the worm 13 alternately in opposite directions, by reason of the alternate driving of the gear 16 by the internal mutilated gear 20 and the external mutilated gear 21. This alternate movement of the worm 13 moves the corn in the tube 10 alternately forward and backward, the amount of such forward and backward movement depending upon the size of the gear 16 with relation to the number of teeth in the gears 20 and 21. Since the internal mutilated gear 20 produces a greater movement of the worm 13 than does the external mutilated gear 21, there is a resultant gradual movement of the worm 13 in the direction to feed the pop corn toward the left hand end of the tube 10, and out through the discharge opening 25. As the pop corn is moved forward and backward within the tube 10, with a resultant gradual forward feeding, it is popped by the heat from the heater 11, and is fed out as popped corn through the discharge opening 25. The action is continuous, for as popped corn is being discharged from the opening 25 other corn is popped within the tube 10 and still other corn is being fed through the opening 26.

I claim as my invention:

1. A pop corn machine, comprising a tubular pop corn support, a heater for said tubular pop corn support, a worm conveyer coöperating with said tubular pop corn support, and driving mechanism for operating said worm conveyer alternately in opposite directions but through a greater angular distance in one direction than the other.

2. A pop corn machine, comprising a pop corn support, a heater for said pop corn support, a worm conveyer coöperating with said pop corn support, and driving mechanism for operating said worm conveyer alternately in opposite directions but through a greater angular distance in one direction than the other.

3. A pop corn machine, comprising a tubular pop corn support, a heater for said tubular pop corn support, a worm conveyer coöperating with said tubular pop corn support, driving mechanism for operating said worm conveyer alternately in opposite directions but through a greater angular distance in one direction than the other, said tubular pop corn support being arranged to discharge the pop corn at one end, and automatic means for feeding pop corn into such tubular support at the other end.

4. A pop corn machine, comprising a pop corn support, a heater for said pop corn support, a worm conveyer coöperating with said pop corn support, and driving mechanism for operating said worm conveyer alternately in opposite directions but through a greater angular distance in one direction than the other, said pop corn support being arranged to discharge the pop corn at one end, and automatic means for feeding pop corn onto said support at the other end.

5. A pop corn machine, comprising a tubular pop corn support, a heater for said tubular pop corn support, a worm conveyer coöperating with said tubular pop corn support, a driving member, and gearing connecting said driving member and said worm conveyer, said gearing including alternately acting members whereby movement of the driving member in one direction drives the worm conveyer alternately in opposite directions, one of such members producing a greater angular movement of the worm conveyer than the other.

6. A pop corn machine, comprising a pop corn support, a heater for said pop corn support, a worm conveyer coöperating with said pop corn support, a driving member, and gearing connecting said driving member and said worm conveyer, said gearing including alternately acting members whereby movement of the driving member in one direction drives the worm conveyer alternately in opposite directions, one of such members producing a greater angular movement of the worm conveyer than the other.

7. A pop corn machine, comprising a tubular pop corn support, a heater for said tubular pop corn support, a worm conveyer coöperating with said tubular pop corn support, a driving member, gearing connecting said driving member and said worm conveyer, said gearing including alternately acting members whereby movement of the driving member in one direction drives the worm conveyer alternately in opposite directions, one of such members producing a greater angular movement of the worm conveyer than the other, said tubular pop corn support being arranged to discharge the pop corn at one end, and automatic means for feeding pop corn into such tubular support at the other end.

8. A pop corn machine, comprising a pop corn support, a heater for said pop corn support, a worm conveyer coöperating with said pop corn support, a driving member, gearing connecting said driving member and said worm conveyer, said gearing including alternately acting members whereby movement of the driving member in one direction drives the worm conveyer alternately in opposite directions, one of such members producing a greater angular movement of the worm conveyer than the other, said pop corn support being arranged to discharge the pop corn at one end, and automatic means for feeding pop corn onto such support at the other end.

In witness whereof, I have hereunto set my hand at Indianapolis, Indiana, this 29th day of September, A. D. one thousand nine hundred and sixteen.

GUSTAVE A. SCHEEFFER.